June 8, 1926. 1,588,056
B. C. ROCKWELL
METHOD OF MANUFACTURING COMPOSITE LUMBER
Filed Feb. 7, 1923
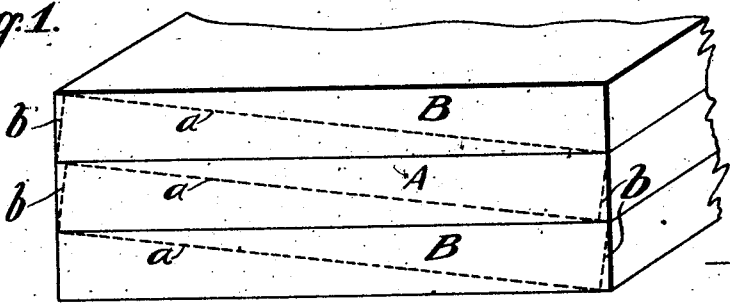
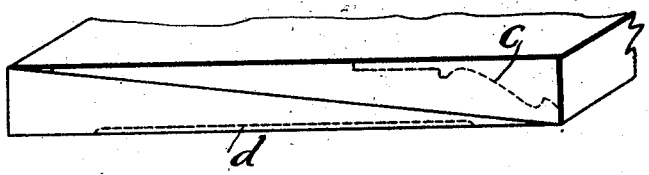
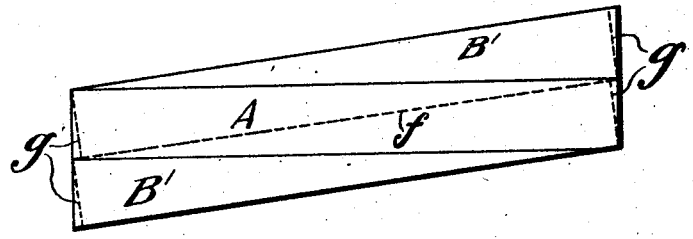
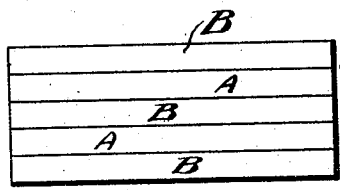
Inventor:
BYRD C. ROCKWELL.

Patented June 8, 1926.

UNITED STATES PATENT OFFICE.

BYRD C. ROCKWELL, OF CAMDEN, ARKANSAS.

METHOD OF MANUFACTURING COMPOSITE LUMBER.

Application filed February 7, 1923. Serial No. 617,566.

This invention relates to composite lumber and the method of manufacturing same, the object being to produce strips of lumber used for finishing the interior of buildings, trimming door and window openings, etc., having a high grade face, with at least one clear edge of high grade material, and a low grade base.

In Patent No. 1,409,410, granted to me March 24, 1922, is shown a strip of composite lumber possessing these characteristics, and my present invention relates more particularly to economical method of producing a strip such as is contemplated in my before mentioned patent.

In the drawings—

Figure 1 is a view illustrating the strips of lumber as first assembled in position.

Figure 2 is a view illustrating one method of finishing one of the severed strips.

Figure 3 is a view illustrating one method of working up the wedge-shaped slab.

Figure 4 is a view illustrating another method of working up the wedge-shaped slabs.

Figure 5 is a modified form of strip arrangement.

In Figure 1 of the drawing are illustrated three strips of lumber, the central strip A being preferably clear hardwood or soft wood, such as pine, depending upon the kind of finish and facing strip desired. B represents a strip of low grade lumber, such as sap gum, etc., there being one of the strips B arranged on each side of the strip A. Strips B, A and B are cemented or glued together preferably by the use of a waterproof compound. In practice these strips are usually held under pressure until the cement or glue is dry.

By virtue of the fact that the central strip A has the cement or glue applied to its opposite faces, there is no tendency of the strips to unequally shrink or warp away from each other.

After the strips are assembled, as shown in Figure 1, they are sawed along the dotted lines *a* producing two faced strips, such as indicated in Figure 2, in which both the high grade facing and the low grade backing are firmly glued together, there being left one clear edge of each. These strips, as shown in Figure 2, by virtue of the obliqueness of the saw cuts *a* may have their facing edges square, as indicated by the dotted lines *b* in Figure 1, which represent either a saw cut or the removal of this material by planing knives.

The composite strip as shown in Figure 2 can have the clear edge of its finishing face formed with a molding, as for instance when used as a baseboard, and the core of the low grade backing strip may be cut away for the purpose of leaving edge contacting surfaces, as indicated by the dotted lines *c* and *d*, respectively.

Figure 3 illustrates one of the wedge shaped slabs removed when the saw cuts *a* are made. These slabs may be re-sawed, as indicated in dotted lines *e*, to make strips which can be worked up as slats for crates, or for other purposes; or, said wedge shaped strips, which I have designated at B' may be applied on opposite sides of a finishing strip A, as shown in Figure 4 being secured to said finishing strip by cement or glue, as mentioned in connection with the assemblage of the parts shown in Figure 1.

After the strips B' are securely attached to the strip A, strip A is severed diagonally by a saw cut indicated by the dotted line *f* and the edges may be finished by planing or sawing, as represented by the dotted lines *g*.

Composite strips of lumber produced by my improved method can be economically produced in large quantities and possess all of the advantages of the strip disclosed in my before mentioned patent.

While I have shown an assemblage of three strips in Figure 1, it is obvious that a greater number of strips may be assembled, as shown in Figure 5 in which strips A alternate with strips B, the latter being preferably the exposed strips at opposite sides of the pile, although this arrangement may, of course, be reversed.

What I claim is:

1. The herein described method of producing composite lumber consisting in uniting a plurality of strips of different grades, and then diagonally severing each of said strips whereby the resultant composite strip has the meeting faces of the constituent strips disposed diagonally relative thereto.

2. The herein described method of producing composite lumber consisting of uniting a plurality of strips of different grades of lumber, and then diagonally severing the united strips, each line of severance occurring within an individual strip.

3. The herein described method of producing composite lumber consisting in uniting a plurality of strips of different grades, then severing said strips so that the uniting line will extend diagonally across the severed strip.

4. The herein described method of producing composite lumber consisting in uniting a plurality of strips of different grades and then severing said united strips so as to leave a clear edge of the united strips on opposite sides of the severed strip.

5. The herein described method of producing composite lumber consisting in uniting a plurality of strips of different grades and then sawing each strip diagonally so as to produce a severed composite strip comprising a portion of two united strips having their meeting line disposed diagonally relative to said composite strip.

In testimony whereof I hereunto affix my signature this 28th day of December, 1922.

BYRD C. ROCKWELL.